US005688417A

United States Patent [19]

Cadre et al.

[11] Patent Number: 5,688,417

[45] Date of Patent: Nov. 18, 1997

[54] DC ARC PLASMA TORCH, FOR OBTAINING A CHEMICAL SUBSTANCE BY DECOMPOSITION OF A PLASMA-GENERATING GAS

[75] Inventors: Martine Cadre, Saint Medard en Jalles; Maxime Labrot, Bordeaux, both of France

[73] Assignee: Aerospatiale Societe Nationale Industrielle, Paris, France

[21] Appl. No.: 634,352

[22] Filed: Apr. 18, 1996

[30] Foreign Application Priority Data

May 19, 1995 [FR] France ................................ 95 05972

[51] Int. Cl.$^{6}$ ................................ B23K 10/00

[52] U.S. Cl. ................................ 219/121.52; 219/121.36; 219/121.51; 219/121.48; 219/123; 313/231.31

[58] Field of Search ................................ 219/121.48, 121.52, 219/121.51, 121.36, 75, 121.59, 121.43, 123; 313/231.31, 231.41

[56] References Cited

U.S. PATENT DOCUMENTS

| | | | |
|---|---|---|---|
| 3,139,509 | 6/1964 | Browning . | |
| 3,400,070 | 9/1968 | Naff . | |
| 3,869,593 | 3/1975 | New et al. | 219/121 P |
| 4,683,367 | 7/1987 | Drouet | 219/121.59 |
| 5,012,065 | 4/1991 | Rayson et al. | 219/121.51 |
| 5,147,998 | 9/1992 | Tsantrizos et al. | 219/121.5 |
| 5,262,616 | 11/1993 | Labrot et al. . | |
| 5,296,672 | 3/1994 | Ramakrishnan et al. | 219/121.52 |
| 5,374,802 | 12/1994 | Dorfman et al. | 219/121.52 |

FOREIGN PATENT DOCUMENTS

| | | |
|---|---|---|
| 0427591 | 5/1991 | European Pat. Off. . |
| 0605010 | 7/1994 | European Pat. Off. . |
| 2207961 | 6/1974 | France . |

OTHER PUBLICATIONS

Database WPI, §Ch, Week 9146 (Derwent Publ.), AN 91-335651 & JP-A-03224625 (Babcock-Hitachi).

*Primary Examiner*—Mark H. Paschall
*Attorney, Agent, or Firm*—Fisher, Christen & Sabol

[57] ABSTRACT

DC arc plasma torch, in particular intended for obtaining a chemical substance from a plasma-generating gas (P) which includes said substance.

According to the invention:

the electrode (2A) is in communication with the chamber (3) for injecting the plasma-generating gas via a tubular piece (2B) through which the arc (10) passes and which constitutes the reaction chamber in which said plasma-generating gas (P) gives rise to the plasma (13) under the action of the electric arc (10); and means (7, 8) are provided which make it possible to form a fluid barrier (14) between the electrode (2A) and the plasma (13).

18 Claims, 4 Drawing Sheets

DC ARC PLASMA TORCH, FOR OBTAINING A CHEMICAL SUBSTANCE BY DECOMPOSITION OF A PLASMA-GENERATING GAS

BACKGROUND OF THE INVENTION

1. Field of the Invention

The present invention relates to a DC arc plasma torch, particularly intended for obtaining a chemical substance by decomposition of a plasma-generating gas.

2. Description of the Prior Art

For example, United States patent U.S. Pat. No. 5,262,616 has already disclosed a DC arc plasma torch which includes two coaxial tubular electrodes arranged in extension of each other, on either side of a chamber into which a stream of plasma-generating gas, for example air, is injected. Each of said electrodes is open on the side of said injection chamber, while one of them is additionally open at its end remote from said injection chamber.

First, the arc between said electrodes passes through said injection chamber and ionizes the plasma-generating gas introduced therein. Said arc is anchored by its end feet respectively to the internal face of said electrodes and the ionized gas plasma, at high pressure (from atmospheric pressure to approximately 5 bar) and at very high temperature (several thousands of °C.), passes through the electrode which is open at its two ends and flows, out of said torch, through that opening in this latter electrode which is remote from said injection chamber.

If, in such a torch, a gaseous compound is used as the plasma-generating gas, the plasma flow leaving said torch includes ions of the elements forming said gas, as a result of the action of the electric arc on said plasma-generating gas. For example, if the plasma-generating gas is hydrogen sulfide, the plasma flow includes hydrogen ions and sulfur ions. As a result, if said plasma flow is subjected to thermal quenching, it is possible to collect the elements of the plasma-generating gas. In the above example, the use of hydrogen sulfide as plasma-generating gas and then the quenching of the plasma, therefore make it possible to collect sulfur, on the one hand, and hydrogen, on the other hand.

Thus, a torch of the type described above can be used as a reactor for the decomposition of plasma-generating gaseous compounds.

However, the use of such a torch in a decomposition reactor gives rise to difficulties:

A/ First of all, it is well-known that, in a torch of the type described above, the electrodes are eroded under the action of the arc feet which detach particles from the internal walls of said electrodes. The result of this is therefore that, when such a torch is used in a decomposition reactor, the chemical substances obtained are contaminated by these particles of the material of the electrodes (for example, copper). In such an application, the contamination is highly accentuated by the interaction, at the arc feet, of some of the decomposition ions (such as the sulfur ion $S^{--}$, for example) with the material of the electrodes.

Thus, not only do such decomposition reactors undergo rapid wear, but it is also not possible for the decomposition products obtained to be pure.

In order to attempt to overcome such drawbacks, two measures have already essentially been opposed. The first consists in making the electrodes from materials which are relatively unreactive with the plasma-generating gas used, such as, for example, tungsten or rhodium-containing tungsten. As for the second, it consists in distributing the wear on the electrodes around their axis by generating a magnetic field which can rotate the arc feet about said axis. Means for obtaining such a rotation of the arc feet are, for example, described in documents U.S. Pat. No. 3,301,995 and EP-A-0,032,100. They are generally defined by electromagnetic coils surrounding the electrodes. Thus, by modulating the axial magnetic field generated by the coils when they are excited, the anchoring feet of the electric arc move around the internal surfaces of the electrodes, thus avoiding the formation of local craters and rapid destruction of the electrodes.

The two known measures mentioned above do indeed make it possible to reduce the wear on the electrodes and the contamination of the decomposition products. However, such a reduction is generally insufficient to provide the electrodes with a sufficient working life and to ensure the desired decomposition product purity. In addition, the first measure generally proves to be expensive.

B/ In addition, the energy efficiency of such a torch used in a reactor is low, so that it is necessary to expend large amounts of electrical energy in order to decompose the gaseous compound into its elements, and the manufacturing cost of said elements is high.

SUMMARY OF THE INVENTION

The object of the present invention is to overcome these drawbacks. It relates to an arc plasma torch with a long working life, which is particularly suited for being used as a thermochemical decomposition reactor, operates with high energy efficiency and makes it possible to obtain high-purity decomposition products.

To this end, according to the invention, the DC arc plasma torch, in particular intended for obtaining a chemical substance from a plasma-generating gas which includes said substance, said torch comprising, a first electrode and a second electrode, said electrodes being tubular, coaxial and arranged in extension of each other, on either side of a chamber for injection of said plasma-generating gas, said electrodes being open at their ends which face said injection chamber, and means for injecting a stream of the plasma-generating gas into said injection chamber, the arc between said electrodes passing through the said injection chamber and being anchored by end feet respectively to the internal surface of said electrodes, while said first electrode is open at its end remote from the said injection chamber in order to allow the plasma generated by said arc to flow out of the torch, is noteworthy in that:

said first electrode is in communication with said injection chamber via a first tubular piece through which said arc passes and which constitutes a first reaction chamber in which said plasma-generating gas gives rise to the plasma under the action of said electric arc; and first means are provided which make it possible to form a fluid barrier between said first electrode and said plasma.

Thus, by virtue of the invention:

the plasma is formed in a reaction zone decoupled from the arc feet. In consequence, when it is formed, said plasma cannot be contaminated by the particles detached from the material of the electrodes; and the particles of material of the first electrode, which are detached by the corresponding arc foot, are prevented from being incorporated with the plasma.

In consequence, the plasma leaving the torch according to the present invention is particularly pure.

In addition, said fluid barrier forms a sheath protecting the internal surface of the first electrode against the erosive action of the ions in the plasma. The working life of this electrode is, moreover, thereover improved.

Preferably, said first tubular piece is securely joined to said first electrode, and it may even form only a single piece with the latter, so as to appear as an extended part of said electrode.

It will be noted that, since the first tubular piece fulfills no electrical function with regard to the arc in steady state, it can be dimentioned in volume, diameter and length so that the aerothermic conditions (pressure, temperature) make it possible to optimize the chemical yield and therefore the energy efficiency. Thus, by virtue of the present invention, the geometry of the torch can be defined as a function of the criteria associated with the optimization of the thermochemical reactions to be set up, and not merely as a function of functional criteria associated, for example, with the development of the electric arc and/or the stability of the electrodes over time (as is the case for known torches).

The invention therefore makes it possible to obtain a plasma torch, with reduced wear:

capable of producing chemical compounds uncontaminated by the electrode erosion products; and able to optimize, without power limitation, the aerothermic conditions of the reactions by adjusting the dimensioning of the reaction zone.

Advantageously, said first means for forming said fluid barrier consist of first blowing means which generate, on the internal wall of said first electrode, a first tubular flow of a gas at a pressure at least approximately equal to that of the plasma and at a temperature very much lower than that of said plasma, said first tubular fluid flow surrounding said flow of the plasma and flowing in the same direction as the latter.

Thus, the particles of material of the first electrode which are detached by the arc foot are removed by said first fluid flow out of the torch, without contact with the plasma.

It will be noted that, at the exit of the plasma torch according to the present invention, a central plasma flow containing the decomposition ions of the plasma-generating gas is therefore obtained, as well as an annular flow which is constituted by the blowing gas and surrounds said central flow of the plasma. As mentioned above, the central plasma flow is at a very high temperature (several thousands of °C.) and at high pressure (from atmospheric pressure to approximately 5 bar). Moreover, the annular blowing flow may be at a low temperature (for example ambient temperature) and at a pressure of the order of that of the plasma. In consequence, the central flow and the annular flow have very different viscosities, preventing them from mixing. The electrode particles detached by the arc cannot therefore move from the annular flow of the blowing gas to the central plasma flow which is surrounded by this annular flow.

Thus:

the plasma is not originally contaminated by the particles detached from the electrodes, by virtue of the decoupling between the reaction zone and the arc feet; and the plasma cannot be contaminated at the exits of the torch by said particles, because of the impossibility of mixing between the plasma and the blowing flow.

The blown gas may, for example, be hydrogen.

In order to facilitate the enclosure of the plasma flow by said tubular barrier flow, it is advantageous for said fist electrode to have a larger diameter than said first tubular piece and for said first blowing means to be arranged between said first tubular piece and said first electrode.

This blowing gas may be blown along the internal wall of said first electrode, parallel to the axis of the latter.

As a variant, the gas of said first tubular flow may be blown inside said first electrode, tangentially to the internal wall of the latter, in a manner similar to that which is generally employed for the so-called vortex injection of the plasma-generating gas into the injection chamber. Such tangential blowing means may include an inner ring and an outer ring which are coaxial and form between them an annular chamber fed with blowing gas through said outer ring, while the central opening in said inner ring at least approximately forms an extension of the internal surface of said first electrode and said central opening in the inner ring is joined to said annular chamber by at least one orifice which is tangential to said central opening.

In order to further improve the efficiency of the torch according to the present invention, while eliminating the particles detached by the arc from the second electrode, it is also advantageous if:

said second electrode is also open at its end remote from said injection chamber, so that there are two said plasma flows taking place through each of said electrodes;

said second electrode is also in communication with said injection chamber via a second tubular piece through which said arc passes and which constitutes a second reaction chamber in which said plasma-generating gas gives rise to the plasma under the action of said electric arc;

second means are provided which make it possible to form a fluid barrier between said second electrode and said plasma.

Of course, said second electrode and its associated elements may have the same particular features as those mentioned above with regard to the first electrode.

Preferably, the plasma torch according to the present invention includes means for displacing the arc feet, such as those described above. Of course, such means do not have to act on the first and second tubular pieces but only on the electrodes.

Moreover, in order to ignite the electric arc between the electrodes, means are provided which may, in a known fashion, be of the type with electrical discharge produced between the two electrodes or of the type with short circuit, by virtue, for example, of the use of an auxiliary start-up electrode. Thus, it is possible to ignite said electric arc between those parts of said electrodes which adjoin said injection chamber (said first and second tubular pieces), and then to extend said arc under the effect of the vortex injection of the plasma-generating gas until the feet of said arc are anchored to the internal surface of said end parts of the electrodes, which are remote from said injection chamber (the electrodes proper).

Advantageously, said means for injecting the plasma-generating gas into said chamber make it possible to inject it in vortices along planes perpendicular to the common axis of the electrodes. These injection means may comprise (see U.S. Pat. No. 5,262,616 mentioned above) an axisymmetric part which is coaxial with said electrodes and defines with them, and their supports, said injection chamber. Transverse orifices are provided in the piece in order to allow injection of the plasma-generating gas, output by a feed circuit, into the chamber.

In the torch according to the invention, the temperatures reached by the plasma at the exits of the torch may exceed 5000° C. It is thus essential to provide cooling circuits for the electrodes, as is moreover conventional for plasma torches.

In one embodiment of the plasma torch according to the present invention, which is especially suitable for the decomposition of hydrogen sulfide, the particular features are as follows:

electrical power: 500 kW current: 200 to 700 A plasma-generating gas flow rate: 35 to 150 $Nm^3/h$ blown gas flow rate: 3 to 15 $Nm^3/h$.

It will be clearly understood from the above description that if, at the exit of at each of the exits of said torch, a quenching device (of any known type) is arranged in the path of the plasma, products of very high purity are obtained.

BRIEF DESCRIPTION OF THE DRAWING

The figures of the appended drawing will clearly explain how the invention may be embodied. In these figures, identical references denote similar elements.

DETAILED DESCRIPTION OF THE INVENTION AND ITS PREFERRED EMBODIMENT(S)

Figure 1:
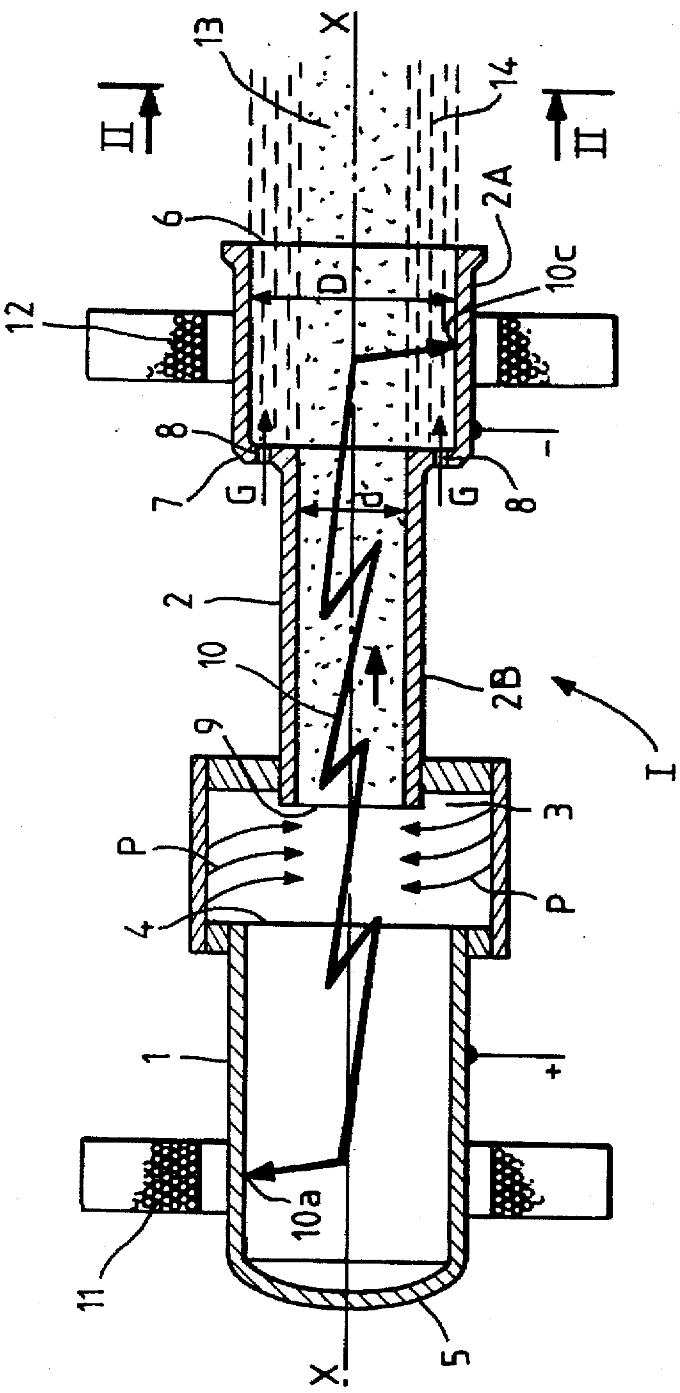
FIG. 1 shows, in highly schematic longitudinal section, a first example of a plasma torch according to the present invention, making it possible to illustrate the inventive principle thereof.

The embodiment I of the plasma torch according to the present invention, represented highly schematically in FIG. 1, includes an anode and a cathodic piece 2, which are tubular and coaxial, arranged in extension of each other along an axis X-X, on either side of a chamber 3 into which a plasma-generating gas is injected (arrows P) in any known fashion. The anode 1 and the cathodic piece are cooled in any suitable unknown fashion (not shown).

The anode 1 is extended along the axis X-X and includes, at its end arranged facing the injection chamber 3, an opening 4 which connects the interior of said anode 1 to said injection chamber 3. In contrast, at its end opposite the injection chamber 3, the anode 1 is closed off by an end wall 5.

The cathodic piece 2 includes, at its end remote from the injection chamber 3, a cathode 2A which is open to the exterior through an opening 6. The cathode 2A is extended, in the direction of the injection chamber 3, by a tubular piece 2B which forms an integral part of said cathode 2A. The cathode 2A has a diameter D greater than the diameter d of the tubular piece 2B, and a shoulder 7 joins the cathode 2A and the tubular piece 2B. Orifices 8, distributed around the axis X-X and having an axis at least substantially parallel thereto, are provided in this shoulder 7. At its end opposite the cathode 2A, the tubular piece 2B includes an opening 8 which connects the interior of the cathodic piece 2 to said injection chamber 3.

In the steady state, an electric arc 10 passes through the injection chamber 3 and the tubular piece 2B and is anchored, by its end feet 10*a* and 10*c*, respectively on the internal surface of the anode 1 (in the vicinity of the end wall 5 opposite the injection chamber 3) and on that of the cathode 2A.

Electromagnetic coils 11 and 12, intended for rotating the feet 10*a* and 10*c* of the arc 10 about the axis X-X, respectively surround the anode 1 (in the vicinity of the end wall 5) and the cathode 2A.

Thus the stream of plasma-generating gas P penetrating the tubular piece 2B is converted in the latter and under the action of the arc 10, into a plasma flow 13 emerging through the opening 6 after having passed through the cathode 2A. The tubular piece 2B therefore forms a reaction chamber in which the plasma-generating gas is converted into a plasma, at high pressure and at very high temperature, including ions of the components of said plasma-generating gas. It is clear that the tubular piece 2B may be dimensioned so as to optimize the energy efficiency.

Figure 2:
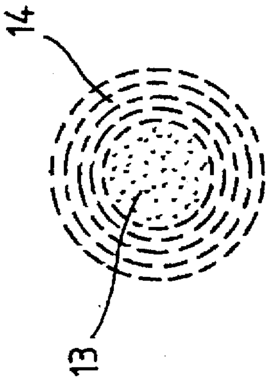
FIG. 2 illustrates the cross section, along the line II—II in FIG. 1, of the fluid flow at the exit of the plasma torch.

In addition, a gas G, for example hydrogen, is blown through the orifices 8 in the shoulder 7 at the periphery of the plasma flow 13. This gas forms an annular gaseous stream 14, at ambient temperature and at a pressure of at least approximately equal to that of the plasma, which flows in the same direction as the plasma. In consequence, during its passage through the cathode 2A and when it emerges therefrom (downstream of the opening 6), a plasma flow 13 is completely surrounded by a sheath which is formed by the gaseous annular stream 14 and establishes a fluid barrier between the cathode 2A and the plasma flow 13 (see also FIG. 2).

The result of this is that the particles of material of the cathode 2A, which are detached from the internal surface thereof by the arc foot 10*c*, not only cannot mix with the plasma flow 13 but are further removed by the gaseous annular stream 14. They cannot therefore contaminate the plasma flow 13. Since, in addition, the particles of material of the anode 1 which are detached therefrom by the arc foot 10*a* remain in the anode 1 (which is obtained by virtue of the fact that the anode 1 is long and that the arc foot 10*a* is situated in the vicinity of the end wall 5), the plasma flow 13, which includes ions of the components of the plasma-generating gas, is particularly pure.

It is clearly seen that, downstream of the opening 6, a quenching device (not shown, but of any known type) makes it possible to separate the annular gaseous stream 14 from the plasma flow 13, then to extract the chemical components contained in the form of ions in said plasma flow 13.

Figure 3:
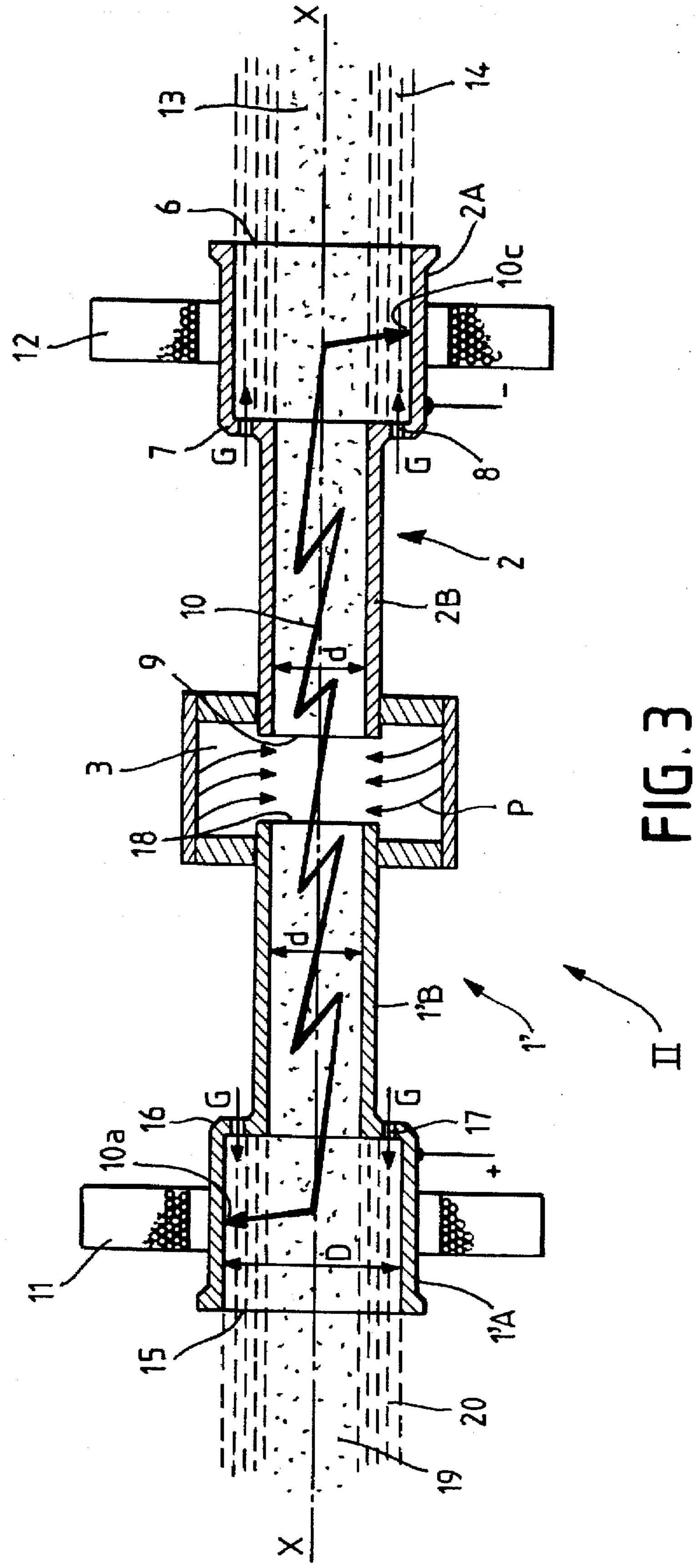
FIG. 3 shows, also in highly schematic longitudinal section, a second example of a plasma torch according to the present invention.

In the variant of illustrative embodiment II of the plasma torch according to the present invention, represented highly schematically in FIG. 3, the elements 2, 2A, 2B, 3 and 6 to 14 in FIG. 1 are reproduced. However, in this variant, the anode 1 is replaced by an anodic piece 1' of structure similar to that of the cathodic piece 2.

To this end, the anodic piece 1' includes, at its end remote from the injection chamber 3, an anode 1'A which is open to the exterior through an opening 15. The anode 1'A is extended, in the direction of the injection chamber 3, by a tubular piece 1'B forming an integral part of said anode. The anode 1'A has a diameter D greater than the diameter d of the tubular piece 1'B, and a shoulder 16 joins the anode 1'A and the tubular piece 1'B. Orifices 17, distributed around the axis X-X and having an axis at least substantially parallel thereto, are provided in this shoulder 16. At its end opposite the anode 1'A, the tubular piece 1'B includes an opening 18 which connects the interior of the anodic piece 1' to the injection chamber 3.

In the steady state, the electric arc 10 passes through the injection chamber 3 and the tubular pieces 1'B and 2B and is anchored, by its feet 10*a* and 10*c*, respectively on the internal surface of the anode 1'A and of the cathode 2A.

The plasma-generating gas injected into the chamber 3 is thus divided into two streams, one of which penetrates the tubular piece 1'B and the other of which penetrates the tubular piece 2B. In these tubular pieces 1'B and 2B, said plasma-generating gas streams are converted into two opposed plasma flows 13 and 19 emerging through the openings 6 and 15 after having passed respectively through the cathode 2A and the anode 1'A. The tubular pieces 1'B and 2B therefore form reaction chambers in which the plasma-generating gas is converted into plasma.

Annular gas streams 14 and 20 are blown through the orifices 8 and 17 in the shoulders 7 and 16, respectively at the periphery of the plasma flows 13 and 19. These annular gaseous streams are at ambient temperature and at a pressure at least approximately equal to that of the plasma and flow respectively in the same direction as said plasma flows 13 and 19. In consequence, during its passage through the anode 1'A and the cathode 2A and when it emerges therefrom (downstream of the openings 6 and 15), the plasma flows 13 and 19 are completely surrounded by sheathes which are formed respectively by the gaseous annular streams 14 and 20. These annular streams therefore establish a fluid barrier between the plasma flows 13 and 19 and the cathode 2A and the anode 1'A, respectively, avoiding any contamination of said plasma flows by the particles of material detached from the electrodes by the arc feet 10*a* and 10*c*. In illustrative embodiment II in FIG. 3, a quenching device (not shown) is provided downstream of each of the openings 6 and 15.

Figure 4:
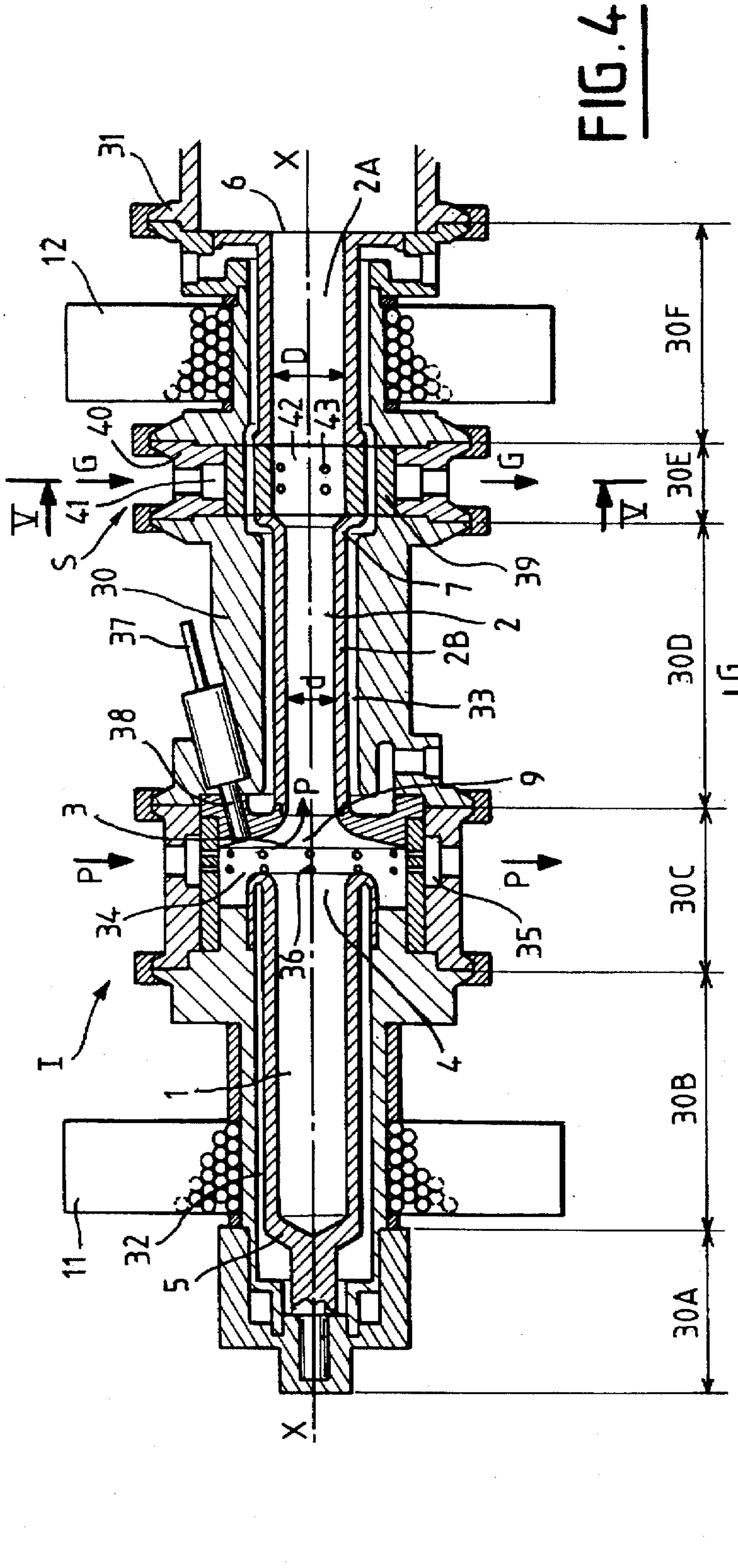
FIG. 4 is the simplified longitudinal section of one practical embodiment of the plasma torch in FIG. 1.

FIG. 4 represents a practical embodiment of the example I in FIG. 1. It can be seen in this figure that the tubular body 30 of the plasma torch, surrounding the anode 1 and the cathodic piece 2, consists (for the purposes of design simplicity) of a plurality of sections 30A, 30B, 30C . . . coaxial with one another and with said electrodes and assembled in leaktight fashion one after the other. In addition, connection means 31 are provided for leaktight connection of the open end 6, remote from the injection chamber 3, of the cathode 2A to a quenching device (not shown). Conduits 32 and 33 are respectively provided around the anode 1 and the cathodic piece 2 for the circulation of a fluid for cooling them.

The means 34 for injecting the plasma-generating gas into the injection chamber 3 are of the vortex injection type, such as those described in U.S. Pat. No. 5,262,616. They consist of an axisymmetric part, coaxial with the axis X-X and including an annular groove 35, fed with plasma-generating gas (arrows P) and joined to the injection chamber 3 by transverse orifices 36.

In order to ignite the electric arc 10 between the electrodes, a short-circuit ignition device 37 is provided, of known type with an auxiliary start-up electrode 38. The arc 10 can thus be ignited between the parts of the anode 1 and of the tubular piece 2B which adjoin the injection chamber 3, then can be extended under the effect of the vortex injection of the plasma-generating gas, until the feet 10*a* and 10*b* of said arc are anchored to the internal surface of the anode 1 close to the end wall 5 and to that of the anode 2A, in the field of the coils 11 and 12.

Between the tubular piece 2B and the anode 2A, the torch in FIG. 4 (see also FIG. 5) includes a section 30E constituting the device S for tangential blowing of the tubular fluid flow 14 surrounding the plasma flow 13.

By analogy with the means 33 for injecting the plasma-generating gas into the injection chamber 3, the blowing device S includes an inner ring 39 (through which the cooling conduits 33 pass) and an outer ring 40, which are coaxial with the axis X-X and form between them an annular chamber 41 which is fed with blowing gas (see the arrows G) through said outer ring 40. The central opening 42 in the inner ring 39 has a diameter D and at least approximately forms an extension of the internal surface of the cathode 2A. The central opening 42 therefore forms the transition between the internal surface of the tubular piece 2B, of diameter d, and the internal surface of the cathode 2A, of diameter D. It is joined to the annular chamber 41 by orifices 43 which are tangential to its internal surface.

Figure 5:
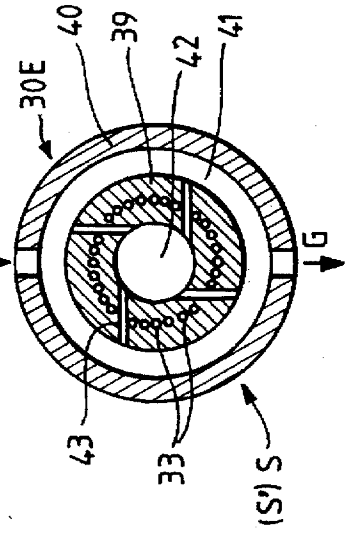
FIG. 5 is a cross section, along the line V—V in FIG. 4.
Figure 6:
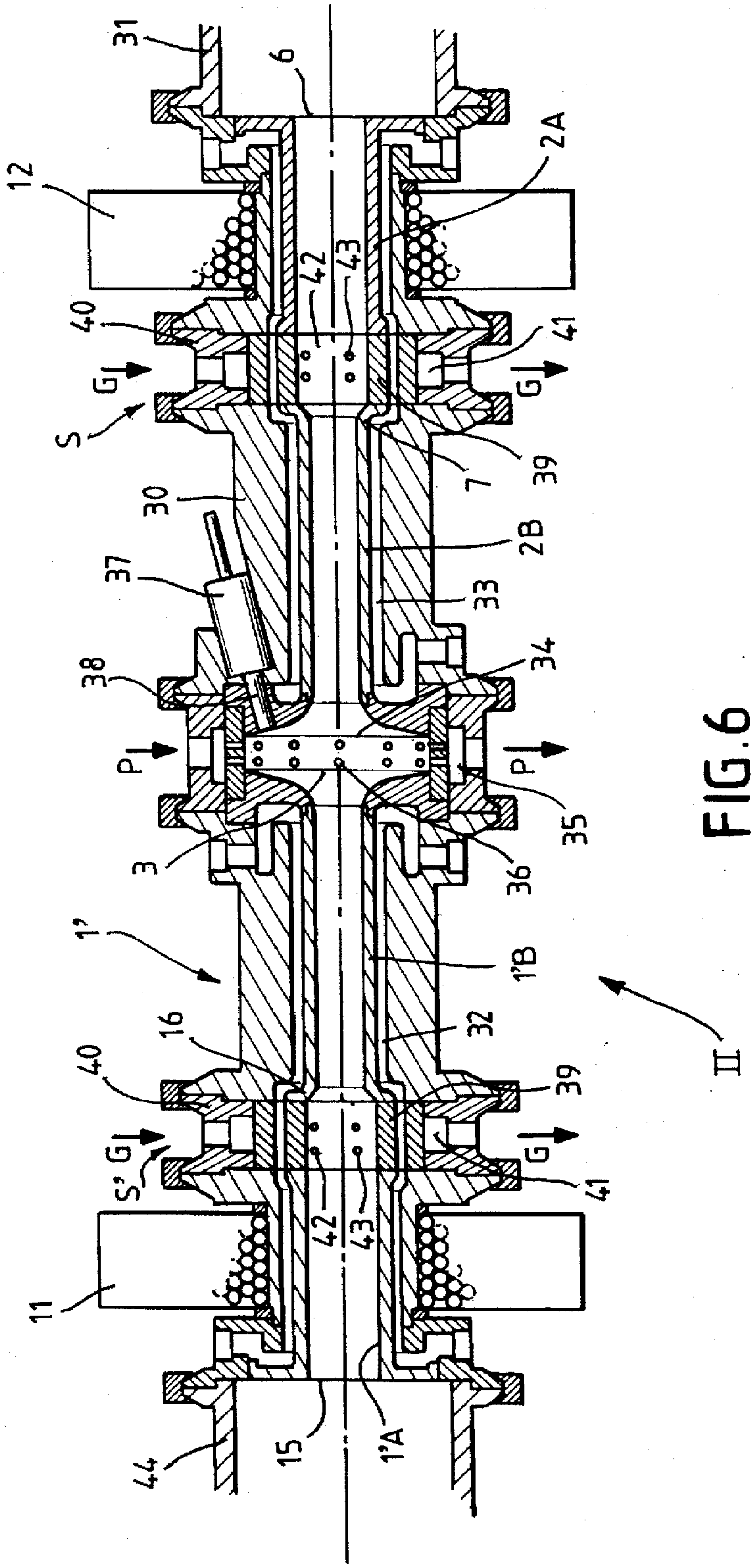
FIG. 6 is the simplified longitudinal section of a practical embodiment of the plasma torch in FIG. 3.

In the practical embodiment of Example II of the plasma torch according to the present invention, represented in section in FIG. 6, the anode 1 has, in comparison with the practical embodiment in FIGS. 4 and 5, been replaced by the anodic piece 1' which is similar (but opposite along the axis X-X) to the cathodic piece 2. In fact, the anodic piece 1' includes the anode 1'A and the tubular piece 1'B which are joined by a tangential blowing device S'. The anode 1'A, the tubular piece 1'B and the blowing device S' are respectively identical to the cathode 2A, to the tubular piece 2B and to the blowing device S. Connection means 44 are provided for leaktight connection of the open end 15, remote from the injection chamber 3, of the anode 1'A to a quenching device (not shown).

We claim:

1. A DC arc plasma torch, in particular intended for obtaining a chemical substance from a plasma-generating gas (P) which includes said substance, said torch comprising,

- a first electrode and a second electrode, said electrodes being tubular, coaxial and arranged in extension of each other, on either side of a chamber (3) for injection of said plasma-generating gas, said electrodes being open at their ends which face said injection chamber, and
- means (34) for injecting a stream of the plasma-generating gas into said injection chamber, the arc (10) between said electrodes passing through said injection chamber and being anchored by end feet (10*c*, 10*a*) respectively to the internal surface of said electrodes, while said first electrode (2) is open at its end remote from said injection chamber in order to allow the plasma (13) generated by said are to flow out of the torch, wherein:
- said first electrode (2A) is in communication with said injection chamber (3) via a first tubular piece (2B) through which said arc (10) passes and which constitutes a first reaction chamber in which said plasma-generating gas (P) gives rise to the plasma (13) under the action of said electric arc (10); and
- first means (7, 8, S) are provided to form a fluid barrier (14) between said first electrode (2A) and said plasma (13), wherein said first means consist of first blowing means (7, 8, S) which generate, on the internal wall of said first electrode (2A), a first tubular flow (14) of a gas at a pressure at least approximately equal to that of the plasma and at a temperature very much lower than that of said plasma (13), said first tubular fluid flow (14) surrounding said flow of the plasma (13) and flowing in the same direction as the latter.

2. The plasma torch as claimed in claim 1, wherein said first tubular piece (2B) is securely joined to said first electrode (2A).

3. The plasma torch as claimed in claim 2, wherein said first tubular piece (2B) and said first electrode (2A) form a single piece (2).

4. The plasma torch as claimed in claim 1, wherein said first electrode (2A) has a larger diameter (D) than said first tubular piece (2B) and wherein said first flowing means (7, 8, S) are arranged between said first tubular piece and said first electrode.

5. The plasma torch as claimed in claim 1, wherein the gas of said first tubular flow is blown along the internal wall of said first electrode, parallel to the axis of the latter.

6. The plasma torch as claimed in claim 1, wherein the gas of said first tubular flow is blown inside said first electrode, tangentially to the internal wall of the latter.

7. The plasma torch as claimed in claim 6, wherein said first tangential blowing means (S) include an inner ring (39) and an outer ring (40) which are coaxial and form between them an annular chamber (41) fed with blowing gas (G) through said outer ring (40), while the central opening (42) in said inner ring (39) at least approximately forms an extension of the internal surface of said first electrode (2A) and said central opening (42) in the inner ring is joined to said annular chamber by at least one orifice (43) which is tangential to said central opening.

8. The plasma torch as claimed in claim 1, wherein:

said second electrode (1'A) is also open at its end remote from said injection chamber (3), so that there are two said plasma flows (13, 19) taking place through each of said electrodes;

said second electrode (1'A) is also in communication with said injection chamber (3) via a second tubular piece (1'B) through which said arc (10) passes and which constitutes a second reaction chamber in which said plasma-generating gas (P) gives rise to the plasma under the action of said electric arc;

second means (16, 17, S') are provided which make it possible to form a fluid barrier (20) between said second electrode (1'A) and said plasma (19).

9. The plasma torch as claimed in claim 8, wherein said second tubular piece (1'B) is securely joined to said second electrode (1'A).

10. The plasma torch as claimed in claim 9, wherein said second tubular piece (1'B) and said second electrode (1'A) form a single piece (1').

11. The plasma torch as claimed in claim 8, wherein said second means for forming said fluid barrier consist of second blowing means (16, 17, S) which generate, on the internal wall of said second electrode (1'A), a second tubular flow (20) of a gas at a pressure at least approximately equal to that of the plasma and at a temperature very much lower than that of said plasma (13), said second tubular fluid flow (20) surrounding said flow of the plasma (19) and flowing in the same direction as the latter.

12. The plasma torch as claimed in claim 11, wherein the gas of said second tubular flow is hydrogen.

13. The plasma torch as claimed in claim 11, wherein said second electrode (1'A) has a larger diameter (D) than said second tubular piece (1'B) and wherein said second flowing means are arranged between said second tubular piece and said second electrode.

14. The plasma torch as claimed in claim 11, wherein the gas of said second tubular flow is blown along the internal wall of said second electrode, parallel to the axis of the latter.

15. The plasma torch as claimed in claim 11, wherein the gas of said second tubular flow is blown inside said second electrode, tangentially to the internal wall of the latter.

16. The plasma torch as claimed in claim 15, wherein said second tangential blowing means (S') include an inner ring (39) and an outer ring (40) which are coaxial and form between them an annular chamber (41) fed with blowing gas (G) through said outer ring (40), while the central opening (42) in said inner ring (39) at least approximately forms an extension of the internal surface of said second electrode (1'A) and said central opening (42) in the inner ring is joined to said annular chamber by at least one orifice (43) which is tangential to said central opening.

17. The plasma torch as claimed in claim 1, which consists of a plurality of sections (30A, 30B, . . . ) coaxial with one another and with said electrodes and assembled in leaktight fashion one after the other.

18. The plasma torch as claimed in claim 1, which includes means (31, 44) for leaktight connection of the open end, remote from the injection chamber (3), of an electrode to a device for quenching said plasma.

* * * * *